United States Patent
Strass

(10) Patent No.: US 8,210,339 B2
(45) Date of Patent: Jul. 3, 2012

(54) DEVICE FOR AUTOMATICALLY SORTING GLASS PLATES

(75) Inventor: Manfred Strass, Harburg (DE)

(73) Assignee: Grenzebach Mashinenbau GmbH, Asbach-Baeumenheim (DE)

( * ) Notice: Subject to any disclaimer, the term of this patent is extended or adjusted under 35 U.S.C. 154(b) by 300 days.

(21) Appl. No.: 12/531,523

(22) PCT Filed: Mar. 12, 2008

(86) PCT No.: PCT/DE2008/000430
§ 371 (c)(1),
(2), (4) Date: Sep. 16, 2009

(87) PCT Pub. No.: WO2008/113324
PCT Pub. Date: Sep. 25, 2008

(65) Prior Publication Data
US 2010/0106288 A1    Apr. 29, 2010

(30) Foreign Application Priority Data
Mar. 16, 2007   (DE) .......................... 10 2007 012 814

(51) Int. Cl.
*B65G 47/31*   (2006.01)
*B65G 49/06*   (2006.01)

(52) U.S. Cl. .................. 198/415; 198/689.1; 198/861.6; 414/790.7; 414/792.7

(58) Field of Classification Search .................. 198/415, 198/457.01, 689.1, 780, 782, 811, 861.2, 198/861.6; 414/788.9, 789.5, 789.9, 790.7, 414/792.7; 901/6, 7, 8
See application file for complete search history.

(56) References Cited

U.S. PATENT DOCUMENTS

| | | | | |
|---|---|---|---|---|
| 2,838,898 A | * | 6/1958 | Owen | 53/244 |
| 3,178,041 A | | 4/1965 | Wheat | |
| 3,410,425 A | * | 11/1968 | Guillaume | 414/798.5 |
| 3,713,650 A | * | 1/1973 | Hodgkinson et al. | 414/798.5 |
| 3,907,127 A | | 9/1975 | Bollinger et al. | |
| 4,954,033 A | * | 9/1990 | Sanders | 414/27 |
| 5,564,892 A | * | 10/1996 | Holbert | 414/793.1 |
| 5,620,293 A | * | 4/1997 | Alarcon-Lopez et al. | 414/399 |
| 5,707,056 A | * | 1/1998 | Rauen et al. | 271/96 |
| 5,918,725 A | * | 7/1999 | Farina | 198/415 |
| 6,126,383 A | * | 10/2000 | Franklin et al. | 414/792 |

(Continued)

FOREIGN PATENT DOCUMENTS

DE    4338981    6/1994

(Continued)

*Primary Examiner* — Douglas Hess
(74) *Attorney, Agent, or Firm* — Duane Morris LLP; J. Rodman Steele, Jr.; Gregory M. Lefkowitz

(57) ABSTRACT

A device and a method for sorting and stacking glass plates of different thicknesses and/or different formats over a divided transport line is described. The device and method are characterized by the following: 1) an aligning device which aligns the glass plates against a left and/or a right abutment strip by means of controllable rolls; 2) a stacking device which lowers the plates supplied by the aligning device and stacks them one above the other; 3) a connectable paper insertion device which lays paper from a store onto a plate; 4) an upright positioner which rotates the stacked plates by a right angle and aligns them on a vertical aligning device; 5) and a robot gripping arm which grips the glass plates aligned on the upright positioner and transports them away for further use.

14 Claims, 9 Drawing Sheets

U.S. PATENT DOCUMENTS

| | | | |
|---|---|---|---|
| 6,840,733 B2 * | 1/2005 | Bjorn et al. | 414/794.4 |
| 6,981,580 B2 | 1/2006 | Meyer | |
| 7,237,421 B2 * | 7/2007 | Von Allwoerden | 72/335 |
| 7,645,111 B2 * | 1/2010 | Mori et al. | 414/676 |
| 7,665,597 B2 * | 2/2010 | Neville | 198/415 |
| 7,722,027 B2 * | 5/2010 | Gibson et al. | 271/12 |
| 2006/0163035 A1 | 7/2006 | Pahud | |

FOREIGN PATENT DOCUMENTS

| | | |
|---|---|---|
| DE | 19935665 | 3/2001 |
| DE | 60201027 | 8/2005 |
| DE | 102004057228 | 6/2006 |
| DE | 102007012814 | 8/2008 |
| FR | 7417605 | 12/1975 |
| JP | 09012146 | 1/1997 |

* cited by examiner

DEVICE FOR AUTOMATICALLY SORTING GLASS PLATES

CROSS-REFERENCE TO RELATED APPLICATIONS

This application is a §371 national stage entry of International Application No. PCT/DE2008/000430, filed Mar. 12, 2008, which claims priority to German Patent Application No. 10 2007 012 814.4, filed Mar. 16, 2007, both of which are hereby incorporated by reference.

BACKGROUND

Despite the fact that it is taken for granted ubiquitously, flat glass processed to give window panes or auto glass is one of the most astonishing materials of our time. In contrast to hollow glass, it took several millennia longer until glass makers in the Middle Ages were able to produce flat glass panels that could be used for windows.

The most recent milestone in flat glass production was the development of the so-called float glass method in 1959. The novelty of the float method consists in the so-called "float ribbon". This consists of molten tin. This tin bath is about 4 to 8 meters wide and up to 60 meters long. In this method, the liquid glass floats on the ideally flat liquid tin. When the glass mass is drawn from the melting furnace onto the tin bath, the tin is at a temperature of 1000° C. At the end of the tin bath, when the now solidified glass ribbon leaves the tin bath, the tin is at a temperature of 600° C. Tin is the only metal which satisfies the conditions required for this method: these are those of already being liquid at 600° C. and still not developing any disturbing vapor pressure at 1000° C.

After the solidified glass ribbon has been divided into the required formats after it has left the tin bath, the glass surfaces obtained in this way have to be stacked in order to be transported further.

U.S. Pat. No. 3,178,041 discloses a device for transporting successive plates, in which these plates, which move on a conveyor belt, are lifted up by means of a vacuum by a component fitted over the belt and are conveyed to one side of the belt via inclined conveying means. Likewise, plates are lifted up by means of a vacuum by a further component and are conveyed to the other side of the belt via inclined conveying means.

In this case, the prior art used as a basis here involves glass plates which transport workers grip with their hands by means of specific tools operating on the basis of vacuum technology and distribute onto both sides of a conveyor belt. Since this work constantly requires a number of workers, U.S. Pat. No. 3,178,041 was therefore based on the object of automating the desired operation.

This prior art merely characterizes the start of the development from the manual stacking of flat articles to mechanical processing of this object.

DE 199 35 665 A1, according to the details in claim 1, discloses a device for layering flat articles, in particular sheet metal panels, on top of one another at a plurality of stacking locations arranged behind one another. This device has a combined transport and depositing device which delivers the articles behind one another without any overlap with respect to one another, is designed as an overhead device, has a switchable article holding device and is intended for supplying the articles to the stacking locations, wherein a control device can be used to slow down the transport and depositing device from a transport speed to a depositing speed. It is also claimed that each article is deposited when or after the depositing speed has been reached, wherein the control device optionally carries out the braking operation with respect to one of the stacking locations or no braking is performed when the article is conveyed through at least one of the stacking locations and transported to the following or one of the following stacking locations and is braked and deposited there.

This device is based on the object of providing a device for stacking flat articles which makes precise and reproducible depositing possible with a high degree of flexibility and the greatest possible protection of the articles, operates quickly and precisely and has a small overall volume.

It is obviously not possible to use this known device for stacking glass plates.

In contrast, DE 10 2004 057 228 A1 discloses a method and a device for the high-speed stacking of plates, in particular glass plates, guided along a plate conveyor; this is based on the object of making it possible to stack plates of this type more quickly.

In order to achieve this object, it is claimed in the method as claimed in claim 1 that the respective plate is lifted up slightly from the plate conveyor at a stacking station by producing suction pressure on the upper side of the plate, is then gripped by frictional engagement or in some other way likewise on the upper side of the plate while retaining the suction pressure acting on the upper side of the plate, and is moved away from the plate conveyor to a position above a stacking table where it is deposited on the plate table by releasing the suction pressure and/or by mechanical pressure on the upper side of the plate counter to the action of the suction force, with the stacking table being lowered by the thickness of a plate after each plate has been deposited.

The method described in claim 1 of DE 10 2004 057 228 A1 and the device claimed in claim 2 essentially do not go beyond the prior art already described.

In addition, EP 1 666 386 A1 discloses a device and a method for orienting flat articles. This device is provided with two belts which run in parallel and can be operated at different speeds.

EP 1 498 370 A1 also discloses a device for transporting and rotating an article, said device having means which are intended to support the article, are arranged in a support plane and have longitudinal and rotational conveyors.

However, the devices in EP 1 666 386 A1 and EP 1 498 370 A1 are not suitable for stacking glass plates.

DE 43 38 981 C2 discloses a device for layering plates each having at least two defined guide holes, each plate being arranged at a predefined, oriented position.

However, an arrangement such as this is not suitable as a device for stacking glass plates.

Furthermore, DE 602 01 027 T2 discloses a device for handling and positioning separating elements in stacks of vertically arranged flat elements. Owing to the sensitivity of glass plates, this device is not suitable for stacking glass plates of different formats.

SUMMARY OF THE INVENTION

Therefore, the present application is based on the object of specifying a device and a method which make it possible to automatically stack glass plates of different formats approximately at the speed at which they are produced, accompanied by the greatest possible protection against breakage.

This object is achieved by the device and method described herein.

This is made possible essentially by the special configuration of three devices which are separate but have an integrative overall effect. These are:

1. the orienting device (1),
2. the stacking device (2) and
3. the upright positioner (3).

A glass furnace supplies a glass ribbon of differing thickness approximately at a speed of 30 meters per minute. The minimum glass thickness which can be processed is about 1.6 mm, thicknesses of about 6 mm can be processed effectively, and thicknesses of 10 mm are achievable. The thinner the glass, the greater the speed of the glass ribbon.

The glass ribbon is then divided into the desired formats and sorted according to the different formats via a linear structure similar to a conveyor belt, sorted into stacks, gripped by a robot arm and transported for further processing. Broken glass is detected automatically and removed.

In the stacking mode, the system according to the invention is able to achieve a processing speed of about 100 meters per minute.

BRIEF DESCRIPTION OF THE DRAWINGS

The text which follows describes the device according to the invention in more detail.

In detail.

DETAILED DESCRIPTION

Figure 1:
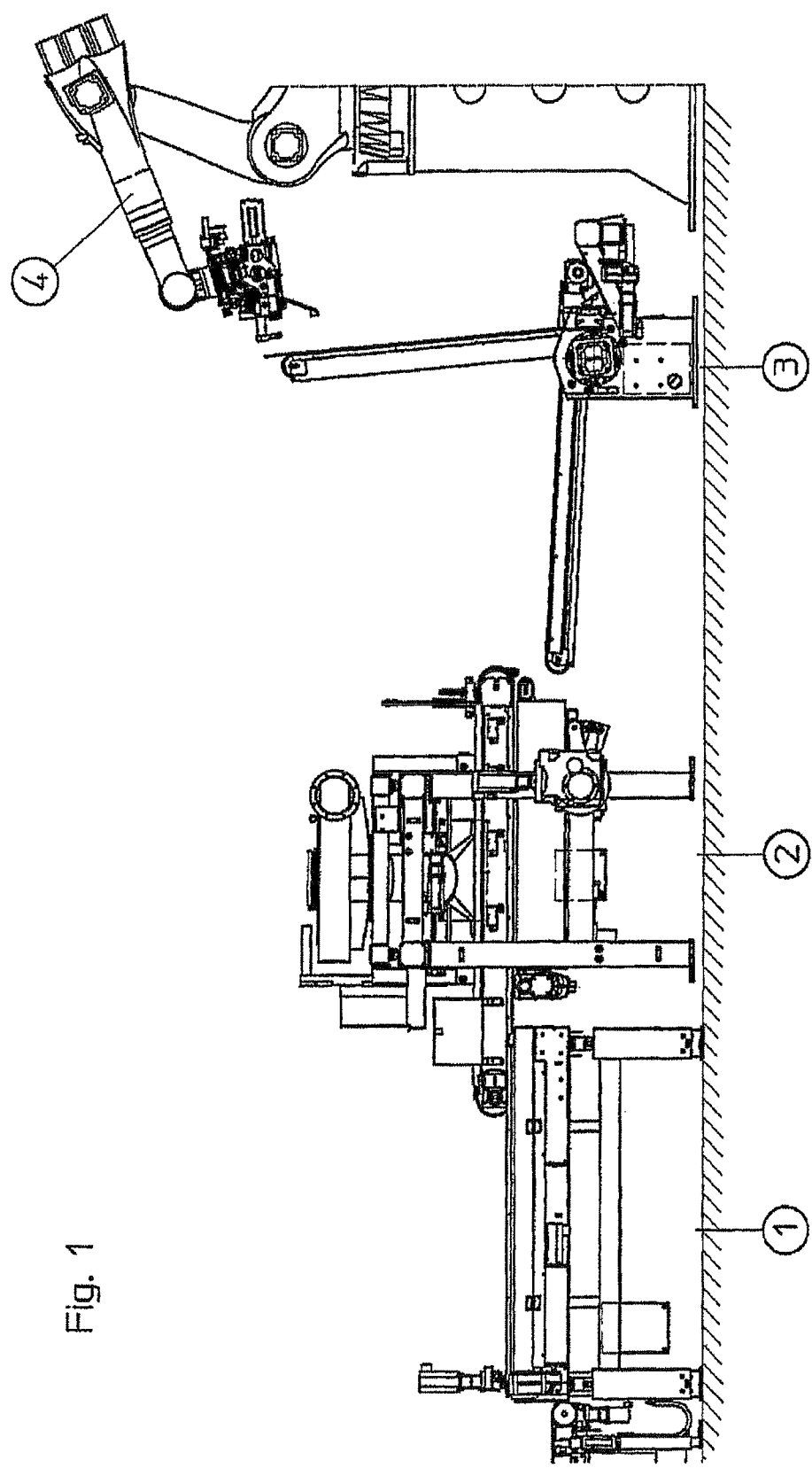
FIG. 1: shows a detailed cross section of the device according to the invention.

FIG. 1 shows a sectional drawing of the device according to the invention in a side view. On the left-hand side of this device, the glass ribbon strikes the orienting device (1). Corresponding system parts of the so-called cooling line, the processing path of the cooled glass material after it leaves the glass furnace, are not shown in FIG. 1.

Before the glass ribbon reaches the orienting device (1), it is divided into the desired formats according to customer requirements and oriented in the orienting device (1) with respect to the left-hand and/or right-hand abutment strip (7) and transported further. Formats which match one another are stacked in the stacking device (2) and then conveyed to the upright positioner (3), where they are gripped by the robot gripping arm (4) and further processed.

Figure 2:
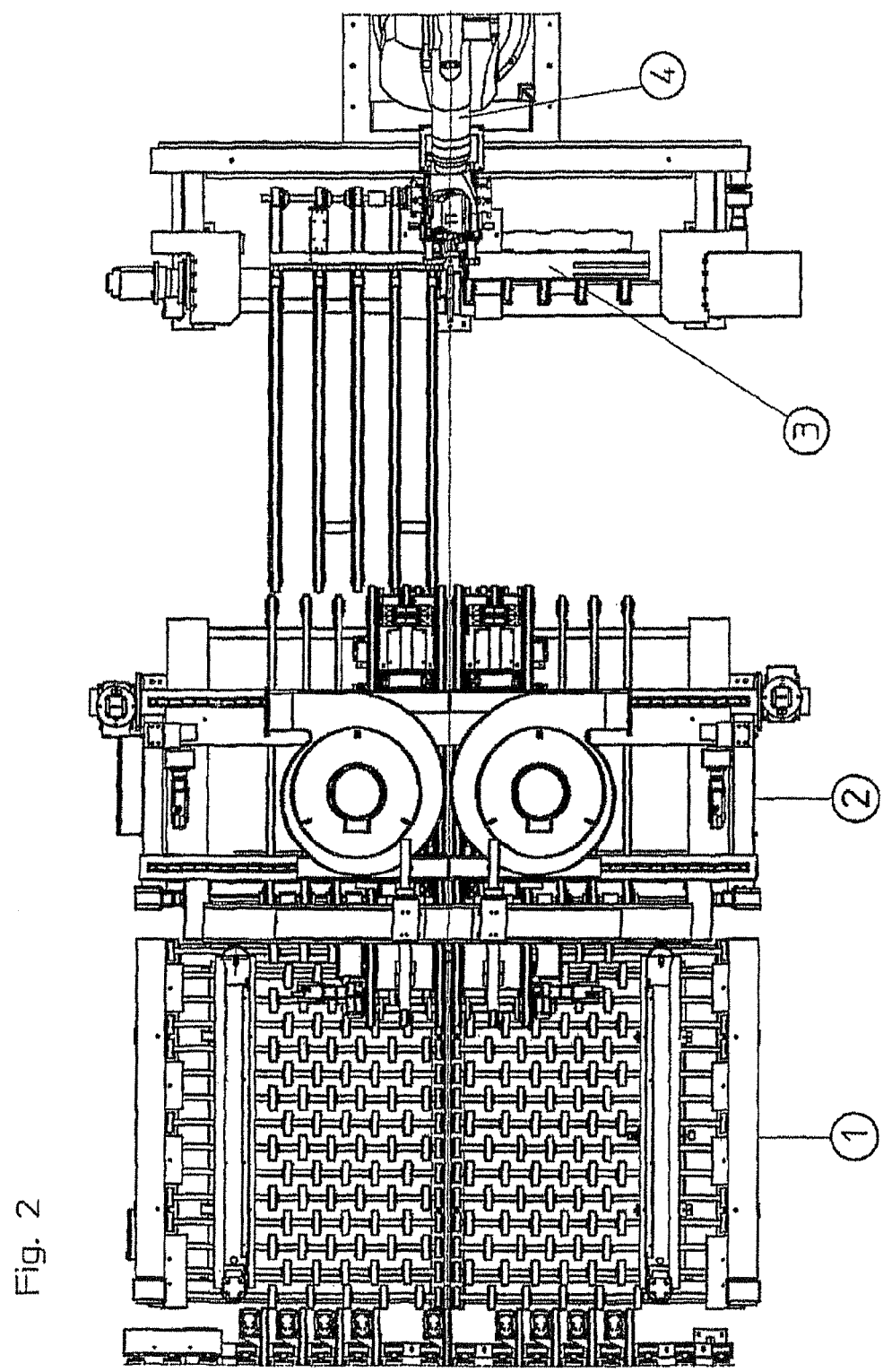
FIG. 2: shows a detailed plan view of the device according to the invention.

FIG. 2 shows the same devices in plan view. The circular fan rotors (not shown in more detail) which produce the intake air for the intake boxes (18) can clearly be seen here in the stacking device (2). Further details are described in the following figures.

Figure 3:
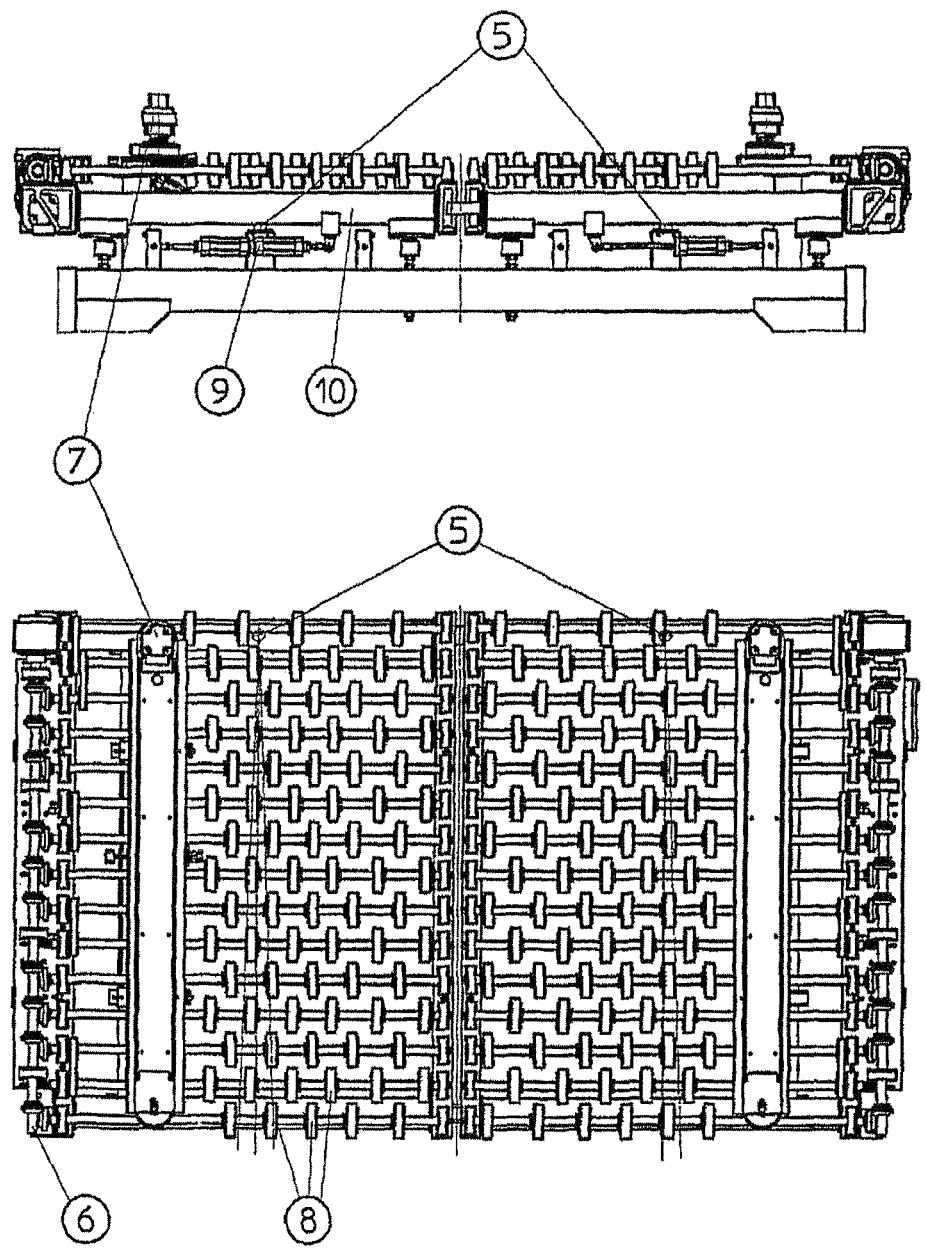
FIG. 3: shows a plan view and a cross section of the orienting device (1)

FIG. 3 shows the orienting device (1) in detail from above and from below in cross section.

The entire orienting device (1) is longitudinally divided into two sections which can be operated independently of one another. This figure shows the two pivot bearings (5) about which the respective section can be pivoted. The individual rollers (8) are mounted in the roller carriers (10), as can also be seen from FIG. 4. The drive (6) of the transport rollers (8) is provided from the respective outer sides by a common drive. A drive controller, which makes it possible to independently control the drive for each axle of the transport rollers, may also be selected for particular control tasks. Smaller groups of transport rollers (8) can additionally be driven independently of one another using divided drive axles which provide further drive options.

Figure 4:
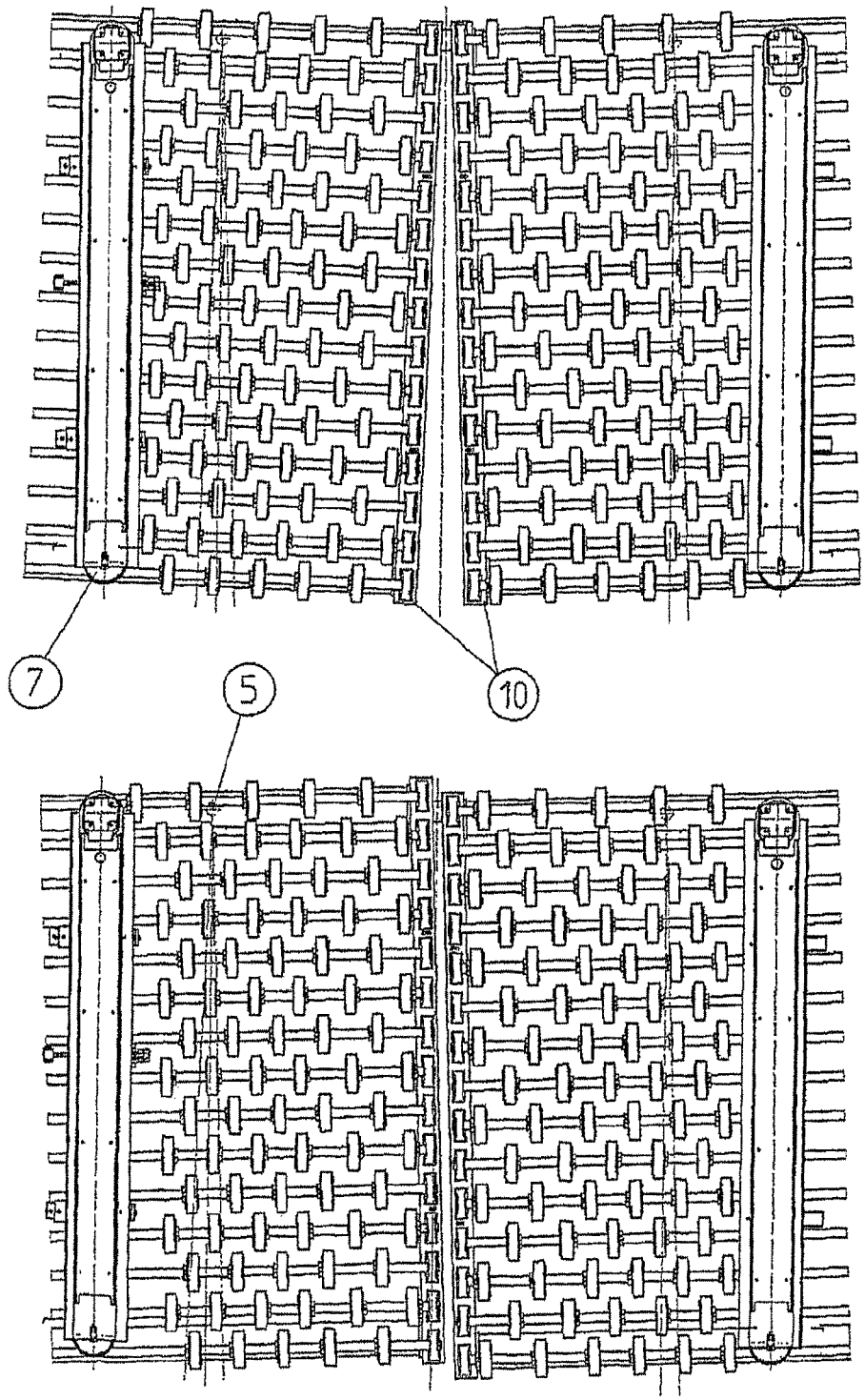
FIG. 4: shows a plan view for illustrating the operation of the orienting device (1)

FIG. 4 shows the two fundamentally different options which are provided when the two sections of the orienting device (1) are pivoted in parallel with one another or, for example when smaller formats are oriented, glass plates are separately oriented with respect to the respective abutment strip (7).

Figure 5:
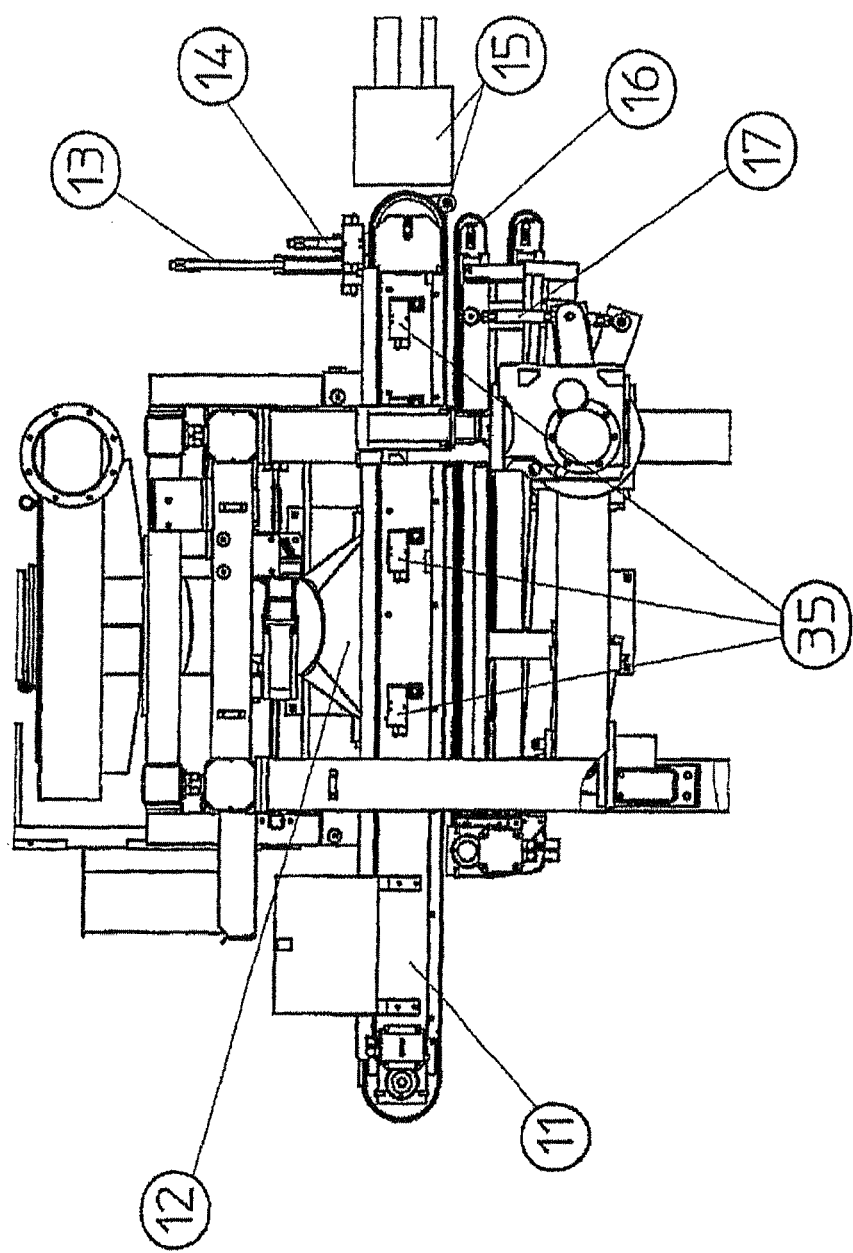
FIG. 5: shows a cross section of the stacking unit (2) in the longitudinal direction.

The left-hand side of the stacking device (2) shown in section in the longitudinal direction in FIG. 5 shows the suction device conveyor belt (11) which, in this cross section, has the appearance of a wide finger. In FIG. 2, which shows the individual system parts from above, it can likewise be seen that this conveyor belt (11) projects in the center into the orienting device (1). The conveyor belt (11) consists of two parts which can each be moved independently of one another by means of a displacement unit (19) over the respective half of the orienting device (1). Owing to the intake effect of a vacuum system, the underside of these two parts of the suction device conveyor belt (11) picks up the glass plates in the different formats oriented on the orienting device (1) and carries them as far as the stack holding device (13). Special ribbing on the underside of the conveyor belts (11) ensures that the glass plates cannot be displaced. The two displacement units (19) for the suction transport device, which units can displace the suction device conveyor belts (11) transversely with respect to the running direction of the cooling line, can be seen in FIG. 6.

This displacement takes place depending on the format of the glass plates to be stacked in each case. FIG. 5 shows a cross section of a vacuum intake duct (12) running in the longitudinal direction. The movement of the glass plates which are sucked on and conveyed further on the conveyor belt (11) is monitored by means of the sensors (35) and the output signals therefrom are evaluated in order to control the conveying of the glass plates.

The plate pressing device (14) lowers the glass plates at the end of the conveyor belt (11) onto the stack belt (16).

Since, in countries with high atmospheric humidity, the lucite powder normally introduced between the individual glass plates as a separation medium agglutinates and therefore cannot fulfill its purpose, it is provided according to the invention to alternatively insert a layer of paper at this point between two glass plates.

This process is carried out by the paper insertion device (15) which is not shown or described in any more detail. Standard models of this are known from the paper processing industry.

The stack belt (16) can not only be lowered horizontally in accordance with the increasing thickness of a sorted glass stack, but can also change its function to an oblique plane via the pivoting cylinder (17). This oblique plane has the same inclination as the transport arm (27) for the upright positioner (3).

Figure 6:
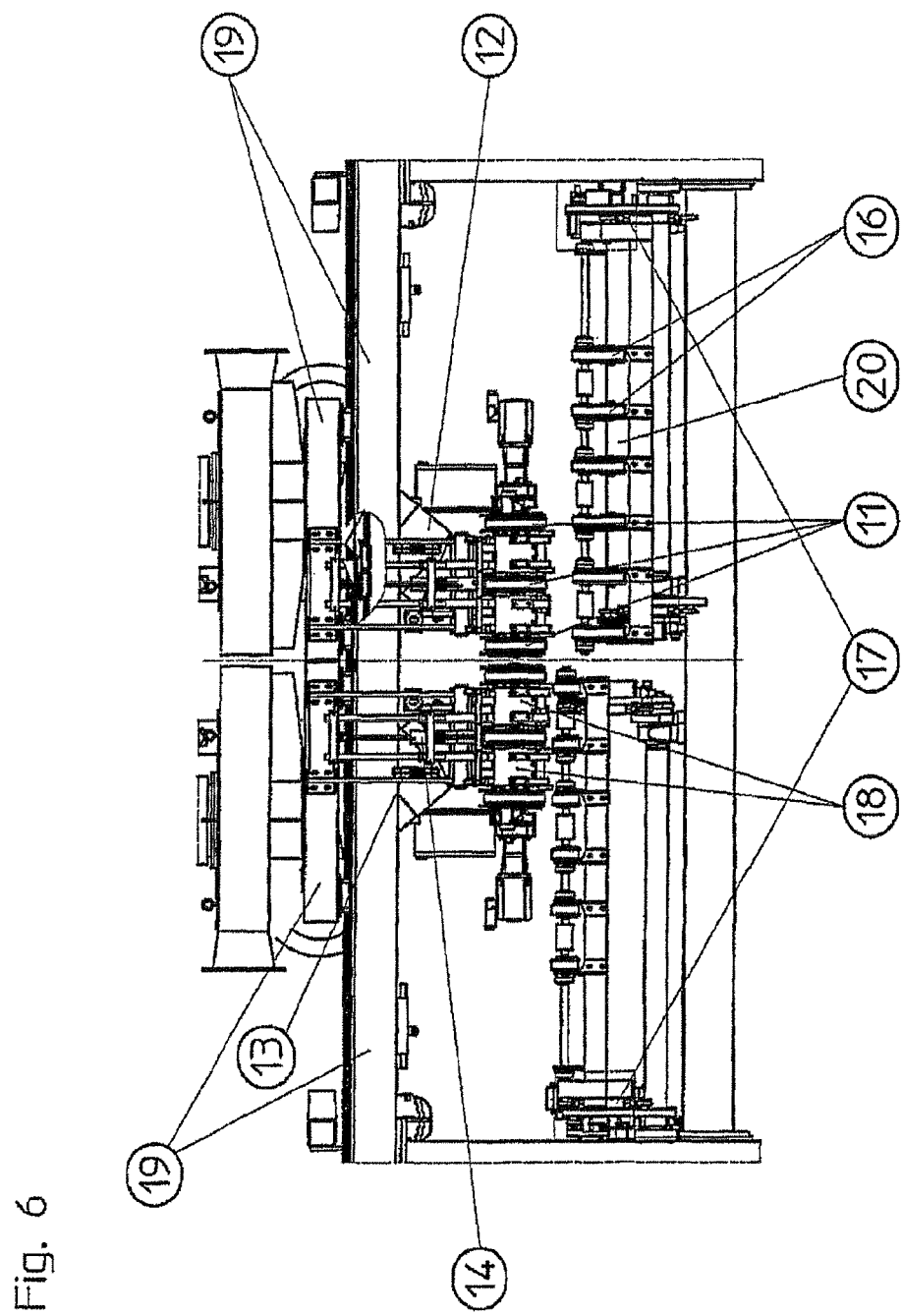
FIG. 6: shows a sectional drawing of the stacking unit (2) transversely with respect to the longitudinal direction.

FIG. 6, which shows the stacking device (2) in section, also shows the stack holding device (13) and the plate pressing device (14).

The vacuum intake ducts (12) in FIG. 5 are likewise shown in section in FIG. 6. In addition to the known pivoting cylinder (17) for the stack belt and the intake boxes in a different view, FIG. 6 shows the pivot arm (20) for the stack belt. In addition, each of the two displacement devices (19) for the suction transport device are shown in the upper region of FIG. 6.

Figure 7:
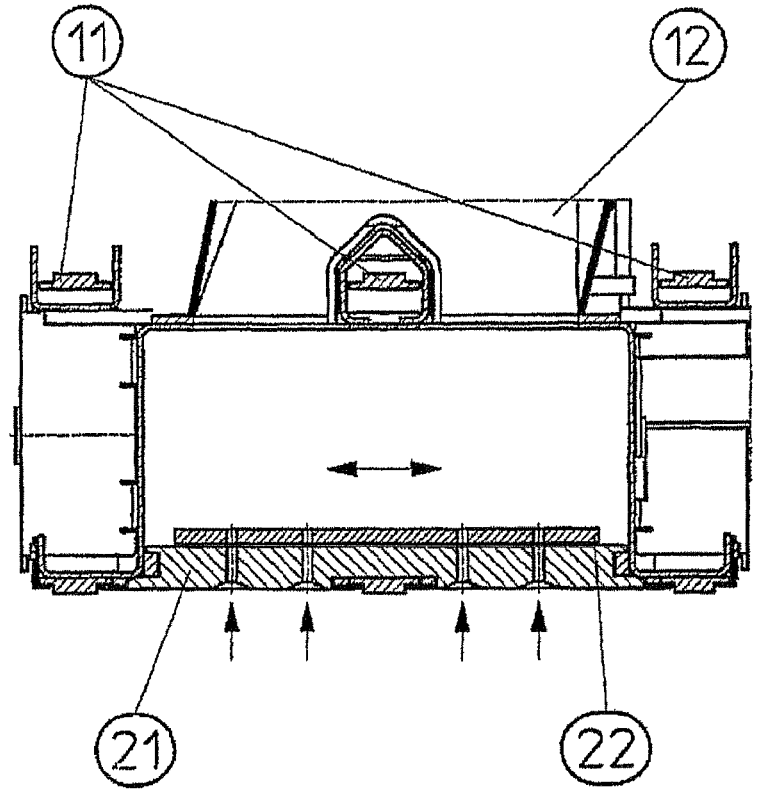
FIG. 7: shows two operating principles for the intake of air in the stacking unit (2)
Figure 7:
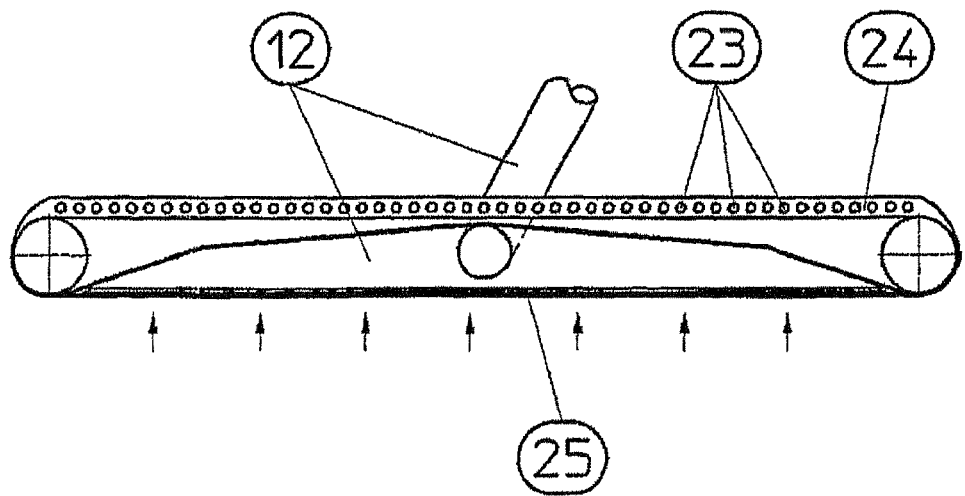

FIG. 7 specifically shows the suction device conveyor belt (11) with the intake surface elements (21) and the blocking sliders (22) for interrupting a suction stream. In this case, air is sucked in through the vacuum intake duct (12) and the respective glass plate is sucked onto the transport rollers (11) via the intake surface elements (21). Here, the blocking sliders (22) for interrupting the suction stream are used to lower the glass plates by the partially controlled or total interruption of the vacuum.

Since energy is wasted in this intake process owing to the unavoidable secondary air, the bottom part of FIG. 7 shows a different construction of the intake device which consumes less energy.

In this case, the intake air is conducted directly through suction openings (23) in the suction conveyor belts (24). The suction air is produced centrally on the outside and distributed over the suction openings (23) by the suction stream controller (25) via separate air hoses. In this solution, it is also possible to drive the suction conveyor belts (23) individually and to control the suction power thereof.

Figure 8:
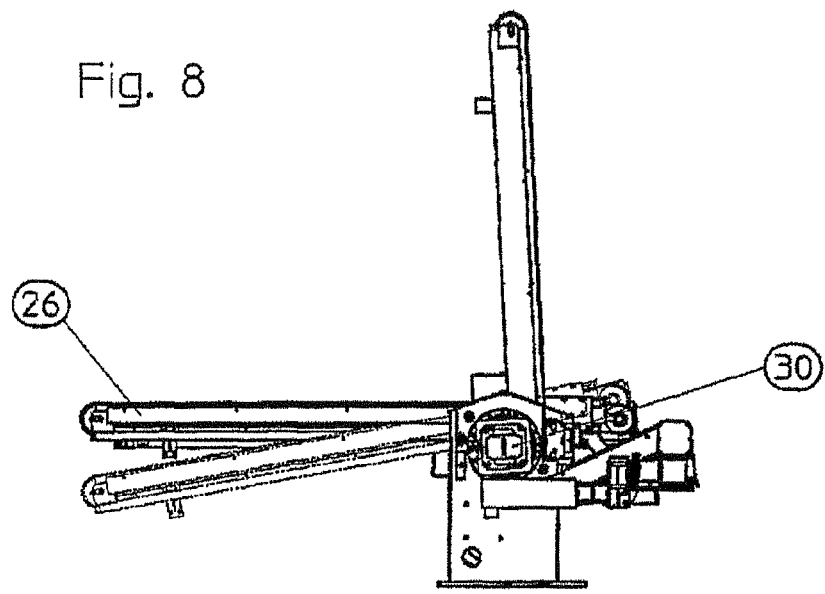
FIG. 8: shows a plan view and a cross section of the upright positioner (3)
Figure 8:
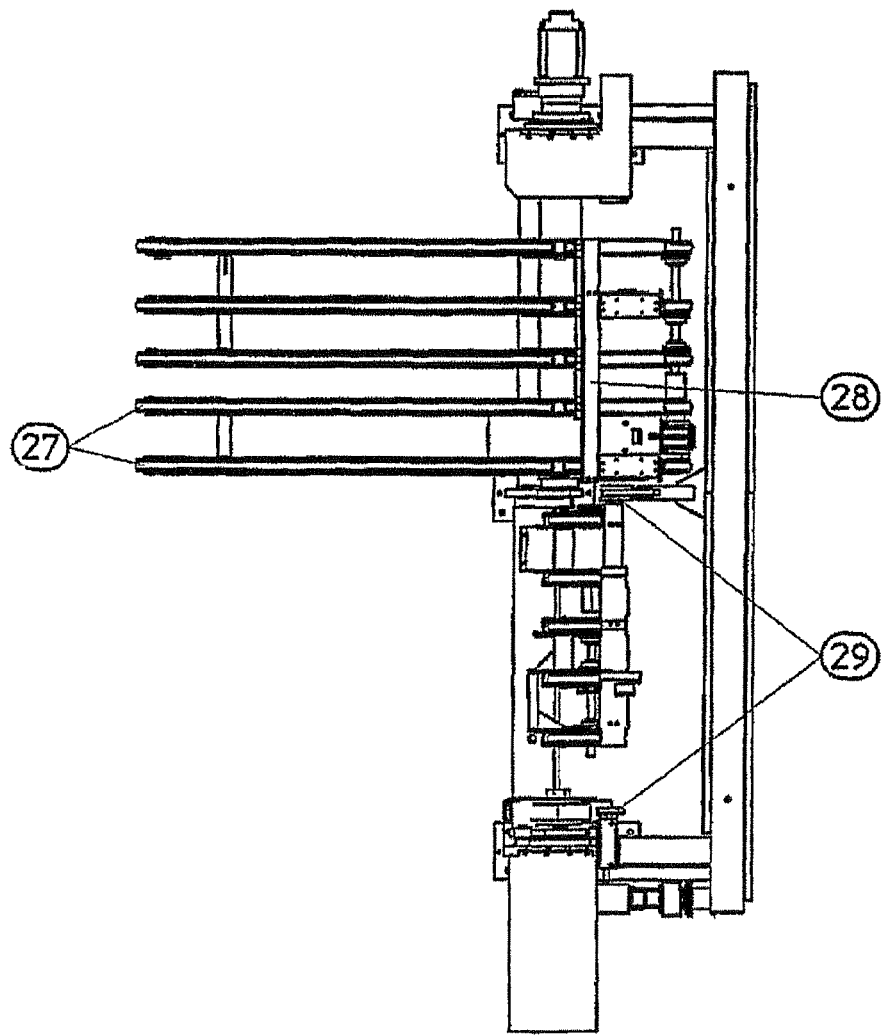

The upper part of FIG. 8 shows a plan view of the upright positioner (3) and the lower part shows a cross section thereof.

The glass stacks are taken from the stacking device (2) via the transport arm (26) or the associated conveyor belts (27), as can be seen from the cross-sectional illustration in FIG. 1.

In this case, the inclination of the stack belt (16) corresponds to the inclination of the transport arm (26).

The center of the upright positioner (3) is provided with a finger-like adjusting lever which is part of the vertical orienting device (29) for the upright positioner (3) and presses the respective glass stack to the left or right out of the center against the respective abutment, wherein, in this process, the sensors in the preliminary line provide information about the dimensions of the respective stack, and this information is taken into consideration. Sensors in the respective end positions of the upright positioner (3) are used to monitor the entire orienting process. The glass stack abutment strip (28) delimits the transport of the glass stack which has previously already been oriented in the stacking device (2) and, as the end of the fixing operation, is placed in the upright position by the drive (30).

Since the stack of glass plates layered on top of one another which is oriented in this way is oriented not only horizontally but also vertically flush, it can be gripped by the robot gripping arm (4) from above or from each side and transported further, depending on the conditions of the format of the glass plates.

Figure 9:
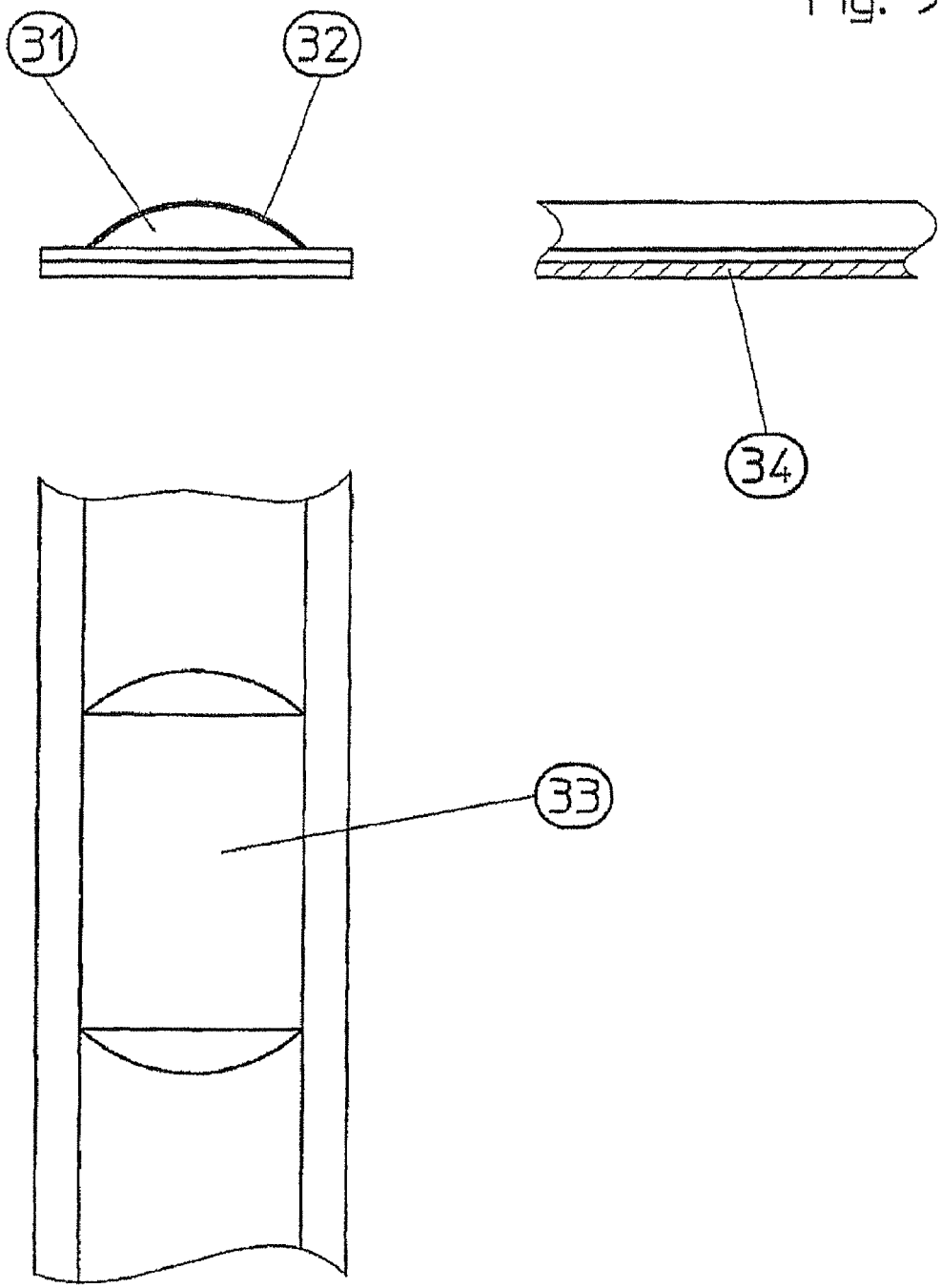
FIG. 9: shows details of the upright positioner (3).

FIG. 9 shows details of the upright positioner (4) with respect to the configuration of the conveyor belt (s) (27).

Each conveyor belt accordingly has a toric support (31) which in turn has an antifriction coating (32). A conveyor belt of this type is driven on the underside via drive wheels which have a serrated surface and, in turn, are in engagement with corresponding serrations on the underside (34) of the conveyor belt.

The support (31) of each conveyor belt is provided with a recess (33) which makes it possible to prevent the finger-like adjusting lever of the displacement unit of the vertical orienting device (29) from being hindered by the support (31) of the conveyor belt.

LIST OF REFERENCE NUMBERS (1) Orienting device
(2) Stacking device
(3) Upright positioner
(4) Robot gripping arm
(5) Pivot bearing for roller carriers
(6) Drive of transport rollers
(7) Abutment strip
(8) Transport rollers
(9) Displacement device for roller carriers
(10) Frame roller carriers
(11) Suction device conveyor belt
(12) Vacuum intake duct
(13) Stack holding device (roller)
(14) Plate pressing device
(15) Paper insertion device
(16) Stack belt
(17) Pivoting cylinder for stack belt
(18) Intake boxes
(19) Displacement unit for suction transport device
(20) Pivot arm for stack belt
(21) Intake surface elements
(22) Blocking slider for interrupting a suction stream
(23) Suction openings
(24) Suction conveyor belt
(25) Suction stream controller
(26) Transport arm for the upright positioner
(27) Conveyor belt for the upright positioner
(28) Glass stack abutment strip
(29) Vertical orienting device for the glass stack
(30) Drive for the pivoting device of the transport arm
(31) Support of the conveyor belt
(32) Antifriction coating
(33) Recess for the displacement unit
(34) Underside of the conveyor belt
(35) Sensors

The invention claimed is:

1. A device for sorting and stacking glass plates of different thicknesses and/or different formats over a conveying line divided in two, said device comprising:
   1) an orienting device (1) which orients the glass plates with respect to a lefthand and/or a right-hand abutment strip (7) via controllable rollers (8), wherein the orienting device (1) comprises two frame roller carriers (10) which can each be rotated separately about a pivot bearing (5),
   2) a stacking device (2) which lowers the plates respectively supplied by the orienting device (1) and stacks the following plates thereon, wherein a suction device conveyor belt (11) conveys the glass plates further and places them on a stack belt (16), and the stack belt (16) can be pivoted transversely with respect to the conveying line by means of a pivoting cylinder (17),
   3) an upright positioner (3) which rotates the stacked plates at a right angle and orients them on a vertical orienting device (29),
   4) a robot gripping arm (4) which grips the glass plates oriented on the upright positioner (3) and transports them on for further use, wherein a transport arm (26) can be pivoted via a drive (30).

2. The device as claimed in claim 1, wherein provision is made of a connectable paper insertion device (15) which, when there is high atmospheric humidity, places paper taken from a store in each case onto a plate lowered in the stacking device (2).

3. The device as claimed in claim 1, wherein the frame roller carriers (10) can be rotated synchronously or separately.

4. The device as claimed in claim 1, wherein the transport rollers of a frame roller carrier (10) can be controlled in groups or together.

5. The device as claimed in claim 1, wherein the left-hand and/or the right-hand abutment strip (7) can be rotated about an axis and/or can be displaced in parallel.

6. The device as claimed in claim 1, wherein the suction device conveyor belts (11) can be displaced horizontally in the stacking device (2) by means of displacement units (19).

7. The device as claimed in claim 1, wherein the glass plates are sucked onto the conveyor belts (11) by a vacuum in the stacking device (2) via intake surface elements (21).

8. The device as claimed in claim 1, wherein the glass plates are sucked onto the suction conveyor belts (24) by a vacuum in the stacking device (2) via suction openings (23) each incorporated in the suction conveyor belts (24).

9. The device as claimed in claim 8, wherein the suction conveyor belts (23) can be individually subjected to open-loop and closedloop control with respect to their intake power.

10. The device as claimed in claim 1, wherein broken glass is detected by means of sensors and removed at the start of the cooling line and/or at the end of the stacking process in the stacking device (2).

11. The device as claimed in claim 1, wherein the glass plates detected are mounted in the upright positioner (3) not only horizontally but also vertically flush, such that they can be gripped by a robot gripping arm (4) both from above and also from the side.

12. The device as claimed in claim 1, wherein all the relevant functions and operating states of the device are monitored by respectively suitable sensors and the output signals from these sensors are used to control a frictionless operating sequence.

13. A method for sorting and stacking glass plates of different thicknesses and/or different formats over a conveying line divided in two, wherein the glass plates pass through various method stages in the processing sequence, comprising the following features:
1) the glass plates are first sorted in an orienting device (1) which orients the glass plates with respect to a left-hand and/or a right-hand abutment strip (7) via controllable rollers (8), wherein the orienting device (1) comprises two frame roller carriers (10) which can each be rotated separately about a pivot bearing (5),
2) the glass plates are stacked in a following stacking device (2) which lowers the plates respectively supplied by the orienting device (1) and stacks the following plates thereon, wherein a suction device conveyor belt (11) conveys the glass plates further and places them on a stack belt (16), and the stack belt (16) can transversely with respect to the conveying line by means of cylinder (17),
3) the stacked glass plates are rotated at a right angle and oriented on a vertical orienting device (29) an upright positioner (3),
4) furthermore, the oriented glass plates are gripped by a robot gripping arm (4) on the upright positioner (3) and are transported on for further use, wherein a transport arm (26) can be pivoted via the drive (30).

14. The method as claimed in claim 13, wherein, when there is high atmospheric humidity, paper taken from a store is in each case placed onto a plate lowered in the stacking device (2) from a connectable paper insertion device (15).

* * * * *